United States Patent
Koga et al.

(10) Patent No.: US 7,607,772 B2
(45) Date of Patent: *Oct. 27, 2009

(54) WATER-BASED INK SET FOR INK-JET RECORDING AND INK-JET RECORDING METHOD

(75) Inventors: Narumi Koga, Nagoya (JP); Masaya Fujioka, Nagoya (JP); Tomoyo Hamajima, Nagoya (JP); Narumi Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 584 days.

This patent is subject to a terminal disclaimer.

(21) Appl. No.: 11/407,291

(22) Filed: Apr. 20, 2006

(65) Prior Publication Data

US 2006/0238590 A1 Oct. 26, 2006

(30) Foreign Application Priority Data

Apr. 21, 2005 (JP) ............................. 2005-124083

(51) Int. Cl.
*G01D 11/00* (2006.01)
(52) U.S. Cl. ........................ 347/100; 347/95; 106/31.13
(58) Field of Classification Search ................. 347/100, 347/95, 96, 101, 84, 85, 88, 99; 106/31.6, 106/31.27, 31.13; 523/160
See application file for complete search history.

(56) References Cited

U.S. PATENT DOCUMENTS 5,609,671 A 3/1997 Nagasawa
5,837,045 A 11/1998 Johnson et al.
2004/0226468 A1* 11/2004 Yamazaki et al. ............ 101/484
2006/0082630 A1* 4/2006 Kato et al. .................... 347/100
2006/0189714 A1* 8/2006 Kato et al. .................... 523/160

FOREIGN PATENT DOCUMENTS

| JP | 19890095093 | 4/1989 |
| JP | 19900127482 | 5/1990 |
| JP | 19960003498 | 1/1996 |
| JP | 20000513396 | 10/2000 |
| JP | 2006-063322 | * 3/2006 |

* cited by examiner

Primary Examiner—Manish S Shah
(74) Attorney, Agent, or Firm—Baker Botts L.L.P.

(57) ABSTRACT

The water-based ink set for ink-jet recording includes a cyan ink and a blue ink with dynamic surface tensions thereof satisfying the following inequalities ($I_{CB}$), ($II_{CB}$), ($III_{CB}$) and ($IV_{CB}$)

$$\sigma_{30C} \leq \text{about } 49 \text{ mN/m} \qquad (I_{CB})$$

$$\sigma_{30C} + \sigma_{30B} \leq \text{about } 100 \text{ mN/m} \qquad (II_{CB})$$

wherein $\sigma_{30C}$ is the dynamic surface tension of the cyan ink at a lifetime of 30 ms and $\sigma_{30B}$ is the dynamic surface tension of the blue ink at a lifetime of 30 ms, $$\sigma_{1000B} \geq \text{about } 36 \text{ mN/m} \qquad (III_{CB})$$

$$\sigma_{1000C} + \sigma_{1000B} \geq \text{about } 70 \text{ mN/m} \qquad (IV_{CB})$$

wherein $\sigma_{1000C}$ is the dynamic surface tension of the cyan ink at a lifetime of 1,000 ms and $\sigma_{1000B}$ is the dynamic surface tension of the blue ink at a lifetime of 1,000 ms.

13 Claims, No Drawings

WATER-BASED INK SET FOR INK-JET RECORDING AND INK-JET RECORDING METHOD

BACKGROUND OF THE INVENTION

1. Field of the Invention

The present invention relates to a water-based ink set for ink-jet recording suitable for reducing graininess in a low density printed part, for extending a color reproduction range and for preventing blurring and color unevenness in a portion recorded with blue or green ink. The present invention also relates to an ink-jet recording method using this water-based ink set for ink-jet recording.

2. Description of the Related Art

When a color image is developed by use of an ink-jet recording method, a three-color ink set has been generally used which is composed of a yellow ink (Y), a magenta ink (M) and a cyan ink (C). Moreover, a four-color ink set has also been used in which a black ink (K) is further added to the three-color ink set.

Generally, in an ink-jet recording method, the gradation of an image is controlled by adjusting the density of dots formed by ejecting ink onto a recording material. However, when the gradation is controlled by such a method, the dot density decreases in a low density printed part. Relative to this, the individual dots become easily discernable to the eye, thereby causing a problem that the image is grainy.

In view of the above, a method has been proposed in which two or more inks are employed as cyan ink (Japanese Patent Application Laid-Open No. H01-95093). In this method, these inks have different dye concentrations and are composed of different kinds of dyes. In addition, a dye which is excellent in vividness but inferior in light fastness is employed in a dark color ink, and a dye which is excellent in light fastness but inferior in vividness is employed in a light color ink. Moreover, a similar method has been proposed for magenta ink (Japanese Patent Application Laid-Open No. H02-127482). According to these methods, graininess can be improved, but a problem remains that a color reproduction range cannot be extended.

Generally, in a three-color ink set composed of yellow, magenta and cyan inks, and also in a four-color ink set in which a black ink is added to the three-color ink set, red color is developed by use of the magenta ink and the yellow ink. When these two inks are used to develop red color as above, problems arise due to a landing error of superposition. That is, sharp printing quality is difficult to achieve, and colors are difficult to be vividly developed. Similar problems arise when blue color is developed by use of the magenta ink and the cyan ink or when green color is developed by use of the cyan ink and the yellow ink.

Recently, color text printing has been increasingly employed. However, in this case, a problem arises that the edge of a line, which is ideally smooth and straight, becomes blurred in an extremely wavy manner in color text.

In order to improve the blurring, a method has been generally employed in which the penetrability of color ink is lowered. However, a recording material such as recording paper has a portion into which ink easily penetrates and a portion into which ink does not easily penetrate, depending on surface conditions such as the irregularity of the fiber constituting the recording material. If the penetrability of color ink is simply reduced, the non-uniformity of the ink penetrability of the recording material results in the variation of the ink penetration amount on a printed material. Thus, inconsistency in color density or color unevenness is likely to occur in a portion which is intended to be printed in a single color. On the other hand, when the ink penetrability is made to increase in order to improve the color unevenness, the color unevenness is improved, but blurring occurs in color text printing.

SUMMARY OF THE INVENTION

The present invention has been made to solve the above-mentioned problems. Objects of the present invention are, in an ink-jet recording method employing cyan ink: (i) to reduce graininess in a low density printed part without reducing the color reproduction range in a high density printed part and with minimizing the number of inks composing an ink set; (ii) to extend a color reproduction range; (iii) to prevent blurring for improving vividness; and (iv) to prevent color unevenness.

The present inventors have conducted extensive studies on a water-based ink set for ink-jet recording. The studies are based on the hypothesis that the dynamic surface tension of the inks constituting the water-based ink set for ink-jet recording is closely related to blurring, color unevenness and reducing graininess in a low density printed part of a color image. Consequently, the present inventors have found that the abovementioned objects (i) to (iv) can be simultaneously achieved by controlling the dynamic surface tension of the inks at two lifetimes (i.e., 30 ms and 1,000 ms).

Accordingly, the present invention provides a water-based ink set for ink-jet recording comprising a cyan ink and a blue ink. This ink set is characterized in that the dynamic surface tensions of the cyan and blue inks as determined by a maximum bubble pressure method at a measurement temperature of 25° C. satisfy the following inequalities ($I_{CB}$), ($II_{CB}$), ($III_{CB}$) and ($IV_{CB}$):

$$\sigma_{30C} \leq \text{about } 49 \text{ mN/m} \qquad (I_{CB})$$

$$\sigma_{30C} + \sigma_{30B} \leq \text{about } 100 \text{ mN/m} \qquad (II_{CB})$$

wherein $\sigma_{30C}$ is the dynamic surface tension of the cyan ink at a lifetime of 30 ms and $\sigma_{30B}$ is the dynamic surface tension of the blue ink at a lifetime of 30 ms, $$\sigma_{1000B} \geq \text{about } 36 \text{ mN/m} \qquad (III_{CB})$$

$$\sigma_{1000C} + \sigma_{1000B} \geq \text{about } 70 \text{ mN/m} \qquad (IV_{CB})$$

wherein $\sigma_{1000C}$ is the dynamic surface tension of the cyan ink at a lifetime of 1,000 ms and $\sigma_{1000B}$ is the dynamic surface tension of the blue ink at a lifetime of 1,000 ms.

In addition, the present invention provides a water-based ink set for ink-jet recording comprising a cyan ink and a green ink. This ink set is characterized in that the dynamic surface tensions of the cyan and green inks as determined by the maximum bubble pressure method at a measurement temperature of 25° C. satisfy the following inequalities ($I_{CG}$), ($II_{CG}$), ($III_{CG}$) and ($IV_{CG}$):

$$\sigma_{30C} \leq \text{about } 49 \text{ mN/m} \qquad (I_{CG})$$

$$\sigma_{30C} + \sigma_{30G} \leq \text{about } 100 \text{ mN/m} \qquad (II_{CG})$$

wherein $\sigma_{30C}$ is the dynamic surface tension of the cyan ink at a lifetime of 30 ms and $\sigma_{30G}$ is the dynamic surface tension of the green ink at a lifetime of 30 ms, $$\sigma_{1000G} \geq \text{about } 36 \text{ mN/m} \qquad (III_{CG})$$

$$\sigma_{1000C} + \sigma_{1000G} \geq \text{about } 70 \text{ mN/m} \qquad (IV_{CG})$$

wherein $\sigma_{1000C}$ is the dynamic surface tension of the cyan ink at a lifetime of 1,000 ms and $\sigma_{1000G}$ is the dynamic surface tension of the green ink at a lifetime of 1,000 ms.

Moreover, the present invention provides an ink-jet recording method characterized by employing the abovementioned water-based ink set for ink-jet recording. Particularly, in an aspect of the invention, there is provided an ink-jet recording method in which a cyan ink having a lightness (L*) in a range of from about 60 to about 85 in the L*a*b* calorimetric system is employed in combination with the blue or green ink in a blue or green ink-recording portion on a recording material.

In the water-based ink set for ink-jet recording of the present invention, the dynamic surface tensions of the cyan ink and the blue ink as determined by the maximum bubble pressure method at a measurement temperature of 25° C. are controlled so as to satisfy the above inequalities ($I_{CB}$), ($II_{CB}$), ($III_{CB}$) and ($IV_{CB}$). In this manner, the following can be achieved: (i) the reduction of graininess in a low density printed part of cyan color; (ii) the extension of a color reproduction range in a blue direction; (iii) the prevention of blurring in portions printed in from cyan color to blue color and particularly the prevention of blurring in blue color text for printing the text vividly and sharply; and (iv) the prevention of color unevenness in portions printed in from cyan color to blue color. Moreover, the dynamic surface tensions of the cyan ink and the green ink as determined by the maximum bubble pressure method at a measurement temperature of 25° C. are controlled so as to satisfy the above inequalities ($I_{CG}$), ($II_{CG}$), ($III_{CG}$) and ($IV_{CG}$). In this manner, the following can be achieved: (i) the reduction of graininess in a low density printed part of cyan color; (ii) the extension of a color reproduction range in a green direction; (iii) the prevention of blurring in portions printed in from cyan color to green color and particularly the prevention of blurring in green color text for printing the text vividly and sharply; and (iv) the prevention of color unevenness in portions printed in from cyan color to green color.

Further, in the water-based ink set for ink-jet recording of the present invention, a full color image having excellent color reproducibility can be formed by including a yellow ink and a magenta ink in addition to the cyan ink and the blue ink and/or the green ink.

The ink-jet recording method of the present invention is a method employing the water-based ink set for ink-jet recording of the present invention to perform ink-jet recording. When color printing is performed by means of this method, the blue or green ink which has a dynamic surface tension of about 36 mN/m or more at a lifetime of 1,000 ms and hence has low penetrability is used in a large amount for the case where blurring on a recording material is required to be improved as in text printing. By using the above blue or green ink in a large amount, sharp printing with suppressed blurring can be performed. In addition, for the case where graininess and color unevenness on a recording material are important issues as in image printing, the abovementioned low penetrability blue or green ink and the cyan ink having high penetrability are employed in combination. Specifically, the high penetrability cyan ink has a dynamic surface tension of about 49 mN/m or less at a lifetime of 30 ms. By employing the low penetrability blue or green ink and the high penetrability cyan ink in combination, a color image can be obtained which has improved graininess, improved color reproducibility, reduced blurring and improved color unevenness.

DETAILED DESCRIPTION OF THE PREFERRED EMBODIMENTS

The present invention will be described below in detail.

In the water-based ink set for ink-jet recording of the present invention, the dynamic surface tensions of a cyan ink and a blue ink and/or the dynamic surface tensions of a cyan ink and a green ink are controlled at two lifetimes of 30 ms and 1,000 ms.

First, the control of the dynamic surface tensions of the cyan and blue inks will be described. In the water-based ink set for ink-jet recording of the present invention, the dynamic surface tensions of the cyan and blue inks at a lifetime of 30 ms as determined by a maximum bubble pressure method at a measurement temperature of 25° C. are controlled so as to satisfy the above-mentioned inequalities ($I_{CB}$) and ($II_{CB}$). The dynamic surface tension at a lifetime of 30 ms is considered to be related to the behavior of the ink which penetrates into a recording material such as recording paper in the thickness direction just after the adhesion on the recording material upon ink-jet recording. When the value of the dynamic surface tension is low, the ink sufficiently penetrates into the recording material in the thickness direction. Therefore, since the ink is not likely to remain on the surface of the recording material, the graininess is considered to be reduced. On the contrary, when this value is high, the non-uniformity of ink penetrability on the surface of the recording material is likely to result in the variations of the penetration amount of the ink, thereby causing color unevenness.

In the present invention, based on inequality ($I_{CB}$), the dynamic surface tension of the cyan ink at a lifetime of 30 ms is controlled to about 49 mN/m or less, and preferably about 46 mN/m or less. Therefore, the penetrability of the cyan ink can be satisfactorily enhanced in the thickness direction of a recording material, thereby preventing the occurrence of graininess and color unevenness. Particularly, by employing an ink having a lightness (L*) in the range of from about 60 to about 85 as the cyan ink, the graininess in a low density printed part in cyan color can be effectively reduced. On the other hand, if the dynamic surface tension of the cyan ink at a lifetime of 30 ms exceeds about 49 mN/m, the graininess in a low density printed part in cyan color cannot be satisfactorily reduced.

Moreover, based on inequality ($II_{CB}$), the sum of the dynamic surface tensions of the cyan and blue inks at a lifetime of 30 ms is controlled to about 100 mN/m or less, and preferably about 96 mN/m or less. As described hereinbelow, the dynamic surface tension of the blue ink at a lifetime of 1,000 ms is increased to about 36 mN/m or higher for preventing the blurring in text in blue color. Therefore, even in this case, the occurrence of color unevenness can be prevented in a blue ink-recording portion such as a blue color image by employing the blue ink and the cyan ink in combination for printing. On the other hand, if the sum exceeds about 100 mN/m, the total penetration amount of the cyan and blue inks is too low to prevent the color unevenness in a blue ink-recording portion.

In the present invention, the phrase "two inks are employed in combination" refers to the following. Taking it for an example that the cyan and blue inks are employed in combination on a recording material such as recording paper, the blue ink is made to adhere to the portion to which the cyan ink is made to adhere before, after or at the same time as the adhesion of the cyan ink. In this case, the cyan and blue inks may be superposed on the recording material or may be adjacent to each other.

Moreover, in the present invention, the dynamic surface tensions of the cyan and blue inks at a lifetime of 1,000 ms as determined by the maximum bubble pressure method at a measurement temperature of 25° C. satisfy the abovementioned inequalities ($III_{CB}$) and ($IV_{CB}$). The dynamic surface tension at a lifetime of 1,000 ms is considered to be related to the behavior of the ink which spreads to blur on the surface of a recording material after the penetration of the ink thereinto the thickness direction. When the value of this dynamic surface tension is low, the penetrability of the ink along the surface of the recording material is high, and blurring is liable to occur.

In the present invention, based on the inequality ($III_{CB}$), the dynamic surface tension of the blue ink at a lifetime of 1,000 ms is controlled to about 36 mN/m or more, and preferably about 40 mN/m or more. Thus, when blue color is developed by the blue ink alone, the blurring of the blue color can be prevented. Consequently, blue color text without blurring can be vividly printed. On the other hand, if the dynamic surface tension of the blue ink at a lifetime of 1,000 ms is less than about 36 mN/m, the penetrability of the blue ink is too high to prevent the blurring in blue color text.

Moreover, in the present invention, based on the inequality ($IV_{CB}$), the sum of the dynamic surface tensions of the cyan and blue inks at a lifetime of 1,000 ms is controlled to about 70 mN/m or more, and preferably about 75 mN/m or more. As described above, the dynamic surface tension of the cyan ink at a lifetime of 30 ms is controlled to about 49 mN/m or less for suppressing graininess and color unevenness. Therefore, even in this case, blurring can be prevented in a blue ink-recording portion such as a blue color image by employing the cyan ink and the blue ink in combination. On the other hand, if the sum of the dynamic surface tensions of the cyan and blue inks at a lifetime of 1,000 ms is less than about 70 mN/m, blurring cannot be prevented in a blue ink-recording portion even when the cyan ink and the blue ink are employed in combination.

As described above, according to the water-based ink set for ink-jet recording of the present invention, by employing the cyan and green inks having the controlled dynamic surface tensions, the following can be achieved: (i) the reduction of graininess in a low density printed part of cyan color; (ii) the extension of a color reproduction range in a blue direction; (iii) the prevention of blurring in portions printed in from cyan color to blue color, and particularly the prevention of blurring in blue color text for printing the text vividly and sharply; and (iv) the prevention of color unevenness in portions printed in from cyan color to blue color. Here, the above effects can be achieved by use of the two inks which are the cyan ink and the blue ink.

The dynamic surface tensions of the cyan ink and the green ink can also be controlled in a similar manner. That is, the dynamic surface tensions of these inks are controlled so as to satisfy the above inequalities ($I_{CG}$), ($II_{CG}$), ($III_{CG}$) and ($IV_{CG}$).

In this manner, the following can be achieved: (i) the reduction of graininess in a low density printed part of cyan color; (ii) the extension of a color reproduction range in a green direction; (iii) the prevention of blurring in portions printed in from cyan color to green color and particularly the prevention of blurring in green color text for printing the text vividly and sharply; and (iv) the prevention of color unevenness in portions printed in from cyan color to green color.

In the ink-jet recording method of the present invention employing the water-based ink set for ink-jet recording of the present invention, blue color is basically developed by employing the cyan and blue inks in combination, and green color is basically developed by employing the cyan and green inks in combination. However, if the color unevenness of text, a line or the like is not an important issue, and the improvement of blurring is mainly required, the blue ink or the green ink alone is preferably employed.

The water-based ink set for ink-jet recording of the present invention may comprise the three inks; e.g., the cyan, blue and green inks having the above-described relations for the dynamic surface tensions. Further, the ink set may also comprise a yellow ink and/or a magenta ink. By including the yellow and magenta inks in addition to the above-described cyan, blue and green inks in the ink set, a full color image having excellent color reproducibility can be formed. A black ink may be included in accordance with need. An ink employed in a known ink set may be employed as the yellow, magenta and black inks.

For example, a yellow ink having a hue angle (h) in the range of from about 70° to about 140° in the L*a*b* calorimetric system may be employed as the above yellow ink. Further, a magenta ink having a hue angle (h) in the range of from about 335° to about 360° or from about 0° to about 5° may be employed as the above magenta ink.

The value of the dynamic surface tension defined in the present invention is determined by the maximum bubble pressure method which is suitable for determining the surface tension at a relatively short lifetime. Such a dynamic surface tension can be determined by use of, for example, an automatic dynamic surface tension meter BP-D4 (product of Kyowa Interface Science Co., LTD.). An oscillating jet method, a meniscus method, and other methods in addition to the maximum bubble pressure method are known as a general determination method of the dynamic surface tension.

In the determination of the dynamic surface tension by means of the maximum bubble pressure method, a gas is supplied from a gas supplying source to a probe to generate gas bubbles from the end of the probe which is immersed in an ink. At this time, the generation rate of the gas bubble is changed by changing the flow rate of the gas. The pressure on the gas bubble from the ink is changed along with the gas bubble generation rate change, and the surface tension is determined by this pressure change. The pressure reaches the maximum (the maximum bubble pressure) when the radius of the gas bubble becomes equal to the radius of the end portion of the probe. Thus, the dynamic surface tension C of the ink is represented by the following equation:

$$\sigma = (\Delta P \cdot r)/2$$

wherein r is the radius of the end portion of the probe and $\Delta P$ is the difference between the maximum value and the minimum value of the pressure on the gas bubble.

In the present invention, the term "lifetime" refers to a period of time from when the gas bubble is caused to be away from the probe to form a new surface after the pressure reaches the maximum bubble pressure to when the pressure again reaches the maximum bubble pressure.

The optical characteristics of each of the inks constituting the ink set will next be described. For the aspect of the ink set of the present invention comprising the cyan and blue inks satisfying the relations of the abovementioned inequalities ($I_{CB}$), ($II_{CB}$), ($III_{CB}$) and ($IV_{CB}$), the cyan ink is preferably a light cyan ink having a lightness (L*) in the range of from about 60 to about 85 in the L*a*b* calorimetric system. In addition, the blue ink preferably has a lightness (L*) in the range of from about 35 to about 45 in the L*a*b* calorimetric system.

By adjusting the lightness (L*) of the cyan ink to about 60 or more, the graininess in a low density printed part containing cyan color can be further reduced due to a synergistic effect with a high penetrability into a recording material according to inequality ($I_{CB}$). Moreover, by adjusting the lightness (L*) of the cyan ink to about 85 or less, the original cyan color can be reproduced.

Further, by adjusting the lightness (L*) of the blue ink to about 35 or more and about 45 or less, since also the penetrability thereof into a recording material is low according to the abovementioned inequality ($III_{CB}$), the color reproduction range in the cyan direction is not reduced in a high density printed part. In addition, the color reproduction range in the blue direction can be significantly extended to thereby improve the vividness of blue color.

The hue of the cyan and blue inks will be described. Preferably, the cyan ink has a hue angle (h) in the range of from about 215° to about 255° in the L*a*b* calorimetric system. By adjusting the hue angle (h) within this range, cyan color can be satisfactorily developed. In addition, preferably, the chroma (C*) of the cyan ink is adjusted within the range of from about 40 to about 70. By adjusting the chroma (C*) within this range, vivid cyan color can be satisfactorily reproduced.

Further, preferably, the blue ink has a hue angle (h) in the range of from about 270° to about 285° in the L*a*b* calorimetric system. By adjusting the hue angle (h) within this range, the original blue color can be reproduced. Further, preferably, the chroma (C*) is adjusted within the range of from about 70 to about 80. By adjusting the chroma (C*) within this range, vivid blue color can be reproduced.

For the aspect of the ink set of the present invention comprising the cyan and green inks satisfying the relations of the abovementioned inequalities ($I_{CG}$), ($II_{CG}$), ($III_{CG}$) and ($IV_{CG}$), the cyan ink preferably has optical properties similar to those of the abovementioned aspect comprising the cyan and blue inks. That is, the cyan ink preferably has a lightness (L*) in the range of from about 60 to about 85 in the L*a*b* calorimetric system, a chroma (C*) in the range of from about 40 to about 70, and a hue angle (h) in the range of from about 215° to about 255°.

Preferably, the green ink has a lightness (L*) in the range of from about 35 to about 60 in the L*a*b* calorimetric system. In this manner, since also the penetrability into a recording material is low according to the abovementioned inequality ($III_{CG}$), the color reproduction range in the cyan direction is not reduced in a high density printed area. Further, the color reproduction range in the green direction can be significantly extended, thereby improving the vividness of green color.

In addition, preferably, the green ink has a hue angle (h) in the range of from about 175° to about 215° in the L*a*b* calorimetric system. By adjusting the hue angle (h) within this range, the original green color can be satisfactorily reproduced. Further, preferably, the chroma (C*) is adjusted within the range of from about 60 to about 80. By adjusting the chroma (C*) within this range, vivid green color can be reproduced.

In the present invention, the lightness (L*), the hue angle (h) and the chroma (C*) are defined based on the L*a*b* calorimetric system standardized by the Commission Internationale de l'Eclairage (CIE) in 1976. This calorimetric system is also defined in Japanese Industrial Standards (JIS Z 8729).

In the present invention, the lightness (L*) is a lightness value in an object solidly printed at a resolution of 1,200×1,200 dpi with each of the inks on glossy paper and is obtained by means of a spectrocolorimeter or a similar apparatus. Also, the hue angle (h) and the chroma (C*) are the respective values in the same solidly printed object. In this case, first, color indices (a* and b*) are obtained by means of a spectrocolorimeter or a similar apparatus, and the hue angle (h) and the chroma (C*) are calculated from the following equations (1) and (2) using the obtained a* and b*.

Equation (1): Hue angle (h)

$$h = \tan^{-1}\left(\frac{b^*}{a^*}\right) \text{(when } a^* \geq 0 \text{ and } b^* \geq 0\text{)}$$

$$h = 360 + \tan^{-1}\left(\frac{b^*}{a^*}\right) \text{(when } a^* \geq 0 \text{ and } b^* < 0\text{)}$$

$$h = 180 + \tan^{-1}\left(\frac{b^*}{a^*}\right) \text{(when } a^* < 0\text{)}$$

Equation (2): Chroma (C*)

$$C^* = \sqrt{(a^*)^2 + (b^*)^2}$$

Here, the chroma (C*) represents the distance from the origin ((a*, b*)=(0,0)) in the chromaticity diagram in the L*a*b* calorimetric system.

The "glossy paper" employed in the measurement of the L*, a* and b* values is paper having a coat layer for surface smoothness provided on base paper (body paper). Specific examples of the glossy paper include KASSAI (a registered trademark) glossy finishing (product of FUJI Photo Film Co., Ltd.), ink-jet printer paper (glossy paper, product of KOKUYO Co., Ltd.), thick glossy paper (product of Kodak Co., Ltd.) and the like. The term "object solidly printed at a resolution of 1,200×1,200 dpi" refers to an area which is printed at a resolution of 1,200×1,200 dpi so as to be fully covered with ink. An ink-jet printer is employed for printing, and examples of the ink-jet printer include a digital multi-function device equipped with an ink-jet printer (MFC-5200J, product of Brother Industries, Ltd.) and the like. Examples of the spectrocolorimeter which can be used include Spectrolino (product of Gretag Macbeth) and the like. The color measurement can be performed by use of a light source $D_{65}$ at a viewing angle of 2°.

Each of the inks constituting the ink set of the present invention contains a coloring agent, water and a water soluble organic solvent so as to have the above-mentioned predetermined values of the dynamic surface tension, the lightness (L*), the hue angle (h) and the chroma (C*).

Water soluble dye and/or pigment may be employed as the coloring agent contained in each of the inks. By appropriately combining the water soluble dye and/or the pigment, the each of the inks is adjusted to have the predetermined color.

Representative examples of the water soluble dye employed include direct dyes, acid dyes, basic dyes, reactive dyes, and the like. Also, examples of the preferable water soluble dye include azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like. Particularly, examples of the water soluble dye which is suitable as the ink for an ink-jet recording method and satisfies the required properties such as vividness, water solubility, stability and light fastness include:

direct dyes such as C. I. Direct Yellows 12, 24, 26, 27, 28, 33, 39, 58, 86, 98, 100, 132 and 142, C. I. Direct Reds 4, 17, 28, 37, 63, 75, 79, 80, 81, 83 and 254, C. I. Direct Violets 47, 48, 51, 90 and 94, C. I. Direct Blues 1, 6, 8, 15, 22, 25, 71, 76, 80, 86, 87, 90, 106, 108, 123, 163, 165, 199 and 226, C. I. Direct Greens 1, 26, 28, 59, 80 and 85, and the like; acid dyes such as C. I. Acid Yellows 3, 11, 17, 19, 23, 25, 29, 38, 42, 49, 59, 61, 71 and 72, C. I. Acid Reds 1, 6, 8, 18, 32, 35, 37, 42, 52, 85, 88, 115, 133, 134, 154, 186, 249, 289 and 407, C. I. Acid Violets 10, 34, 49 and 75, C. I. Acid Blues 9, 22, 29, 40, 59, 62, 93, 102, 104, 112, 113, 117, 120, 167, 175, 183, 229 and 234, C. I. Acid Greens 3, 5, 9, 12, 15, 16, 19, 25, 27, 28, 36, 40, 41, 43, 44, 56, 73, 81, 84, 104, 108 and 109, and the like; basic dyes such as C. I. Basic Yellow 40, C. I. Basic Reds 9, 12 and 13, C. I. Basic Violets 7, 14 and 27, C. I. Basic Blues 1, 3, 5, 7, 9, 24, 25, 26, 28 and 29, C. I. Basic Greens 1 and 4, and the like; and reactive dyes such as C. I. Reactive Yellow 2, C. I. Reactive Reds 4, 23, 24, 31 and 56, C. I. Reactive Blues 7, 13 and 49, C. I. Reactive Greens 5, 6, 7, 8, 12, 15, 19 and 21, and the like.

In addition, examples of the pigment include C. I. Pigment Yellows 1, 2, 3, 13, 16, 74, 83, 93, 128, 134 and 144, C. I. Pigment Reds 5, 7, 12, 23, 48 (Mn), 57 (Ca), 112, 122, 144, 170, 177, 221, 254 and 264, C. I. Pigment Violets 19 and 48 (Ca), C. I. Pigment Blues 1, 2, 3, 15, 15:1, 15:2, 15:3, 15:4, 15:5, 15:6, 16, 17:1, 22, 27, 28, 29, 36 and 60, C. I. Pigment Green 7, and the like.

Water soluble dye or pigment may be employed as the coloring agent of the black ink, and a proper combination thereof may also be employed. Examples of the water soluble dye include: direct dyes such as C. I. Direct Blacks 17, 19, 32, 51, 71, 108, 146, 154 and 168; acid dyes such as C. I. Acid Blacks 2, 7, 24, 26, 31, 52, 63, 112 and 118; basic dyes such as C. I. Basic Black 2; C. I. Food Blacks 1 and 2; and the like. Examples of the pigment which can be employed include carbon blacks such as MA8, MA100 (products of Mitsubishi Chemical Corporation), and color black FW200 (product of Degussa). A self-dispersing type carbon black which can disperse in water without using a dispersing agent may be employed as the carbon black. A self-dispersing type carbon black can be obtained by subjecting a carbon black to a surface treatment such that at least one compound having a hydrophilic group such as a carbonyl group, a carboxyl group, a hydroxyl group or a sulfone group or a salt thereof is bound to the surface of the carbon black. Specific examples of the surface treatment include a method disclosed in U.S. Pat. No. 5,609,671 and a method disclosed in WO97/48769. Alternatively, a commercial product such as CAB-O-JET (a registered trade mark) 200, 300 (products of Cabot Corporation) or BONJET (a registered trade mark) CW1 (product of Orient Chemical Industries, Ltd.) may be employed as the self-dispersing black pigment.

The amount of the water soluble dye contained in each of the inks depends on the desired printing density and the desired color. If the amount is too low, the color is not satisfactorily developed on a recording material. If the amount is too high, a nozzle of an ink-jet head tends to be clogged. Thus, the amount of the water soluble dye with respect to the total amount of the corresponding ink is preferably about 0.1 to about 15 wt. %, more preferably about 0.3 to about 10 wt. % and particularly preferably about 0.5 to about 5.0 wt. %.

The amount of the pigment contained in each of the inks depends on the desired printing density and the desired color. If the amount is too low, the color is not satisfactorily developed on a recording material. If the amount is too high, a nozzle of an ink-jet head tends to be clogged. Thus, the amount of the pigment with respect to the total amount of the corresponding ink is preferably about 1 to about 15 wt. % and more preferably about 1 to about 10 wt. %.

Preferably, the water employed in each of the inks is deionized water. The amount of the water is determined based on the kind of the water soluble organic solvent, the composition of the ink and the desired ink properties. If the amount of the water is too low, the viscosity of the ink increases to cause difficulty in ejecting the ink from a nozzle of an ink-jet head. If the amount is too high, the coloring agent is precipitated or aggregated due to the evaporation of water, and thus a nozzle of an ink-jet head tends to be clogged. Therefore, the amount of the water with respect to the total amount of the corresponding ink is preferably about 10 to about 95 wt. %, more preferably about 10 to about 70 wt. % and particularly preferably about 20 to about 70 wt. %.

The water soluble organic solvents employed in each of the inks are broadly categorized into humectant and penetrant.

The humectant is added to the ink for preventing clogging of a nozzle of an ink-jet head. Specific examples of the humectant include water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like. If the amount of the water soluble organic solvent serving as the humectant is too low, the clogging of a nozzle of an ink-jet head is not satisfactorily prevented. If the amount is too high, the viscosity of the ink increases to cause difficulty in ejecting. Therefore, the amount of the water soluble organic solvent with respect to the total weight of the corresponding ink is preferably about 5 to about 50 wt. %, more preferably about 5 to about 40 wt. % and particularly preferably about 5 to about 35 wt. %.

The penetrant is added to the ink for allowing the ink to rapidly penetrate into paper upon printing. Specific examples of the penetrant include glycol ethers typified by ethylene glycol-based alkyl ethers, propylene glycol-based alkyl ethers, and the like. Specific examples of the ethylene glycol-based alkyl ether include ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Specific examples of the propylene glycol-based alkyl ether include propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol-n-ethyl ether, tripropylene glycol-n-propyl ether, tripropylene glycol-n-butyl ether and the like. The amount of the water soluble organic solvent serving as the penetrant may be adjusted in order to provide a desired dynamic surface tension of the ink used.

In addition to the above-described humectant and penetrant, the inks constituting the ink set of the present invention may contain a water soluble organic solvent to prevent drying of ink at the tip of an ink-jet head, to enhance printing density, and to help the development of vivid colors. Examples of such a water soluble organic solvent include: lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones and keto-alcohols such as acetone, diacetone alcohol, and the like; ethers such as tetrahydrofuran, dioxane, and the like; glycerin; 2-pyrrolidone; N-methyl-2-pyrrolidone; 1,3-dimethyl-2-imidazolidinone; and the like.

Moreover, other conventionally known surfactants; viscosity modifiers such as polyvinyl alcohol, cellulose, water soluble resin, and the like; surface tension modifiers; mildewproofing agents; or the like may be added to the inks constituting the ink set of the present invention in accordance with need.

The ink-jet recording method of the present invention performs ink-jet recording by use of the ink set of the present invention. No particular limitation is imposed on the type of the ink-jet recording method. Examples of the ink-jet recording method include an electrostatic suction method, a method using a piezoelectric element and a thermal method.

EXAMPLES

The present invention will be specifically described below by way of Examples.

Examples 1 to 3 and Comparative Examples 1 to 4

(1) Preparation of Inks

Cyan ink 1 having the ink composition shown in Table 1 was prepared as follows.

First, 63.3 parts by weight of water, 30 parts by weight of glycerin, 5 parts by weight of triethylene glycol-n-butyl ether, and 0.2 parts by weight of SUNNOL (a registered trademark) DL-1430 (product of LION Corporation) serving as a surfactant were mixed to prepare 98.5 parts by weight of an ink solvent. Subsequently, 1.5 parts by weight of a cyan water soluble dye (C. I. Direct Blue 199) was added to 98.5 parts by weight of the ink solvent under stirring. The mixture was continued to stir for 30 minutes and filtrated with a membrane filter having a pore size of 1 µm to obtain the cyan ink 1.

The same procedure as in the cyan ink 1 was repeated except that the ink composition was changed as shown in Table 1 to prepare cyan inks 2 to 4, blue inks 1 to 3, green inks 1 and 2, a yellow ink and a magenta ink.

(2) Determination of Dynamic Surface Tension, $L^*$, $a^*$, $b^*$ and h

The dynamic surface tension measurement was performed at lifetimes of 20 ms to 5,000 ms and a measurement temperature of 25° C. by means of an automatic dynamic surface tension meter BP-D4 (product of Kyowa Interface Science Co., LTD.), and the dynamic surface tensions at lifetimes of 30 ms and 1,000 ms were determined.

Each of the inks was filled into a predetermined ink cartridge, and the ink cartridge was attached to a digital multifunction device equipped with an ink-jet printer (MFC-5200J, product of Brother Industries, Ltd.). Subsequently, an object was solidly printed with the ink at a resolution of 1,200×1,200 dpi on glossy paper (KASSAI (a registered trade mark) glossy finishing, product of FUJI Photo Film Co., Ltd.). The solidly printed object was measured for $L^*$, $a^*$ and $b^*$ by means of Spectrolino (product of Gretag Macbeth) (light source: $D_{65}$, viewing angle: 2°).

The value of h was evaluated from the above equation (1) using the measurement values of $a^*$ and $b^*$.

The results are shown in Table 1.

(3) Configuration of Ink Sets

The inks shown in Table 1 were combined as shown in Table 2 to configure the ink sets of Examples 1 to 3 and Comparative Examples 1 to 4. Each of the inks shown in Table 1 serves as ink 1, ink 2 or ink 3 in the ink sets. Here, Comparative Examples 2 and 4 correspond to a conventional ink set.

(4) Evaluation of Ink Sets (4-a) Graininess Evaluation of Cyan Color (C)

For each of the ink sets shown in Table 2, the inks constituting the ink set were filled into predetermined ink cartridges, and the ink cartridges were attached to a digital multifunction device equipped with an ink-jet printer (MFC-5200J, product of Brother Industries, Ltd.). Subsequently, a gradation sample of the cyan ink was printed on glossy paper (KASSAI (a registered trademark) glossy finishing, product of FUJI Photo Film Co., Ltd.) for graininess evaluation.

Each patch of the obtained gradation samples was measured for the lightness ($L^*$) as in (2). The cyan color patch for $L^*$=90 was visually observed, and the graininess was evaluated by the following criteria. The evaluation results are shown in Table 2.

A: Graininess is not found.
B: Graininess occurs but is almost unnoticeable.
C: Graininess is noticeable. Practically problematic.

(4-b) Color Reproducibility Evaluation of Blue Color (B) and Green Color (G)

In the same way as (4-a), for color reproducibility evaluation of blue color, a print pattern sample was printed on glossy paper by use of the printer. In this case, the print pattern sample contained patches of various hues and was printed by changing the mixing ratio of the cyan ink (one of the cyan inks 1 to 4), the blue ink (one of the blue inks 1 to 3) and the magenta ink. Moreover, for color reproducibility evaluation of green color, a print pattern sample containing patches of various hues was printed by changing the mixing ratio of the cyan ink (one of the cyan inks 1, 3 and 4), the green ink (the green ink 1 or 2) and the yellow ink.

A green or blue color patch was selected from each of the print pattern samples, and the selected patch was visually observed to evaluate, by use of the following criteria, whether or not each color was satisfactorily developed. The evaluation results are shown in Table 2.

A: High density color is satisfactorily developed.
B: High density color is developed.
C: High density color is not satisfactorily developed.

(4-c) Density Evaluation of Cyan Color

A cyan color patch was selected from each of the print pattern samples of (4-b), and the selected patch was visually observed to evaluate, by use of the following criteria, whether or not cyan color was satisfactorily developed. The evaluation results are shown in Table 2.

A: High density color is satisfactorily developed.
B: High density color is developed.
C: High density color is not satisfactorily developed.

(4-d) Blurring Evaluation of Blue Color (B) and Green Color (G)

For blurring evaluation, a line pattern sample of blue or green color was printed on ordinary paper (Xerox 4200, product of XEROX Corporation) by use of the same printer as in (4-a). In this case, the blue ink or the green ink alone was employed for printing. However, for an ink set not having these inks, the printing was performed by superposing two color inks constituting the ink set.

The obtained print pattern sample was visually observed to evaluate the blurring of blue or green color by use of the following criteria. The evaluation results are shown in Table 2.

A: Almost no blurring occurs.
B: Blurring occurs to a small extent.
C: Blurring occurs to an appreciable extent.

(4-e) Color Unevenness Evaluation

For color unevenness evaluation, a print pattern sample containing patches of various hues was printed on ordinary paper (Xerox 4200, product of XEROX Corporation) by use of the same printer as in (4-a).

C: Color unevenness occurs to an appreciable extent.

(4-f) Overall Evaluation

Overall evaluation was conducted based on the results of (4-a) the graininess evaluation of cyan color, (4-b) the color reproducibility evaluation of blue color and green color, (4-c) the density evaluation of cyan color, (4-d) the blurring evaluation of blue color and green color, and (4-e) the color unevenness evaluation. These results were overall-evaluated by use of the following criteria. The results are shown in Table 2.

A: All the evaluation results are rank A.
B: The evaluation results contain rank B.
C: The evaluation results contain rank C.

TABLE 1

|  | Cyan ink | | | | Blue ink | | | Green ink | | Yellow ink | Magenta ink |
| --- | --- | --- | --- | --- | --- | --- | --- | --- | --- | --- | --- |
|  | 1 | 2 | 3 | 4 | 1 | 2 | 3 | 1 | 2 | | |
| C.I. Acid Red 52 | — | — | — | — | — | — | — | — | — | — | 2.5 |
| C.I. Direct Blue 199 | 1.5 | 1.5 | 1.5 | 3.0 | — | — | — | — | — | — | — |
| C.I. Acid Blue 112 | — | — | — | — | 6.0 | 6.0 | 6.0 | — | — | — | — |
| C.I. Acid Green 3 | — | — | — | — | — | — | — | 6.0 | 6.0 | — | — |
| C.I. Direct Yellow 86 | — | — | — | — | — | — | — | — | — | 0.4 | — |
| C.I. Direct Yellow 132 | — | — | — | — | — | — | — | — | — | 1.6 | — |
| Glycerin | 30.0 | 30.0 | 30.0 | 30.0 | 30.0 | 30.0 | 30.0 | 30.0 | 30.0 | 30.0 | 30.0 |
| TEGBE *1 | 5.0 | 3.0 | 1.0 | 3.0 | 5.0 | 1.5 | 1.0 | 5.0 | 1.0 | 3.0 | 3.0 |
| SUNNOL ® DL-1430 | 0.2 | 0.1 | 0.1 | 0.1 | 0.2 | 0.1 | 0.1 | 0.2 | 0.1 | 0.1 | 0.1 |
| Ultrapure water | 63.3 | 65.4 | 67.4 | 63.9 | 58.8 | 62.4 | 62.9 | 58.8 | 62.9 | 64.9 | 64.4 |
| Dynamic surface   30 ms | 39 | 46 | 52 | 45 | 41 | 50 | 51 | 40 | 52 | — | — |
| tension          1000 ms | 35 | 39 | 43 | 39 | 35 | 41 | 42 | 33 | 41 | — | — |
| L* | 64 | 64 | 64 | 54 | 42 | 42 | 42 | 49 | 49 | — | — |
| h/° | 229 | 229 | 229 | 234 | 272 | 272 | 272 | 189 | 189 | — | — |

*1 TEGBE = triethylene glycol-n-butyl ether.
*2 SUNNOL ® DL-1430 = anionic surfactant (ether sulfate type, product of LION Corporation).

TABLE 2

|  |  |  | Ex. 1 | Ex. 2 | Comp. Ex. 1 | Comp. Ex. 2 | Ex. 3 | Comp. Ex. 3 | Comp. Ex. 4 |
| --- | --- | --- | --- | --- | --- | --- | --- | --- | --- |
| Ink set | Ink 1 | | Cyan ink 1 | Cyan ink 2 | Cyan ink 3 | Cyan ink 4 | Cyan ink 1 | Cyan ink 3 | Cyan ink 4 |
|  | Dynamic surface | 30 ms | 39 | 46 | 52 | 45 | 39 | 52 | 45 |
|  | tension | 1000 ms | 35 | 39 | 43 | 39 | 35 | 43 | 39 |
|  | Ink 2 | | Blue ink 3 | Blue ink 2 | Blue ink 1 | — | Green ink 2 | Green ink 1 | — |
|  | Dynamic surface | 30 ms | 51 | 50 | 41 | — | 52 | 40 | — |
|  | tension | 1000 ms | 42 | 41 | 35 | — | 41 | 33 | — |
|  | Ink 3 | | Magenta ink | Magenta ink | Magenta ink | Magenta ink | Yellow ink | Yellow ink | Yellow ink |
| Sum of dynamic surface tensions of inks 1 and 2 (30 ms) | | | 90 | 96 | 93 | — | 91 | 92 | — |
| Sum of dynamic surface tensions of inks 1 and 2 (1000 ms) | | | 77 | 80 | 78 | — | 76 | 76 | — |
| Evaluation | (a) Graininess | (C) | A | A | B | C | A | B | C |
|  | (b) Color | (B) | A | A | A | C | — | — | — |
|  | reproducibility | (G) | — | — | — | — | A | A | C |
|  | (c) Density | (C) | A | A | A | A | A | A | A |
|  | (d) Blurring | (B) | A | A | C | C | — | — | — |
|  |  | (G) | — | — | — | — | A | C | C |
|  | (e) Color unevenness | | A | A | B | B | A | B | B |
|  | (f) Overall | | A | A | C | C | A | C | C |

The obtained print pattern sample was visually observed to evaluate color unevenness by use of the following criteria. In this case, the evaluation was not performed for a certain color but was performed over all the patches. The evaluation results are shown in Table 2.

A: Almost no color unevenness occurs.
B: Color unevenness occurs to a small extent.

As shown in Table 2, in Examples 1 and 2, the cyan ink has high penetrability into paper since the dynamic surface tension at a lifetime of 30 ms is sufficiently low. Thus graininess was not found in a low density printed part (L*=90) of cyan color since the concentration of the coloring agent is also low.

In addition, in Examples 1 and 2, since the blue ink was employed, blue color could be satisfactorily developed. Further, this blue ink has a sufficiently high dynamic surface tension at a lifetime of 1,000 ms, and thus the penetrability into paper is low. Therefore, blurring did not occur in the blue color line pattern, and a landing error due to superposition did not occur since the blue ink alone was employed, thereby obtaining sharp printing.

As for color unevenness in a color printed part, the occurrence of color unevenness could be suppressed by employing the low penetrability blue ink and the high penetrability cyan ink in combination. By employing these inks in combination, cyan and blue colors could be reproduced at high densities. Further, colors within the blue color range could be satisfactorily reproduced by employing the cyan and blue inks in combination. This is because the coloring agent concentration of the cyan ink is low, and thus the cyan ink has a small effect on the blue color.

Similarly, in Example 3, the cyan ink having high penetrability into paper and a low coloring agent concentration was employed. Thus, graininess was not found in a low density printed part (L*=90) of cyan color. In addition, in Example 3, since the green ink was employed, green color could be satisfactorily developed. Further, this green ink has low penetrability into paper. Therefore, blurring did not occur in the green color line pattern, and a landing error due to superposition did not occur since the green ink alone was employed, thereby obtaining sharp printing.

As for color unevenness in a color printed part, the occurrence of color unevenness could be suppressed by employing the low penetrability green ink and the high penetrability cyan ink in combination. By employing theses inks in combination, cyan and green colors could be reproduced at high densities. Further, colors within the green color range could be satisfactorily reproduced by employing the cyan and green inks in combination. This is because the coloring agent concentration of the cyan ink is low, and thus the cyan ink has a small effect on the green color.

On the other hand, in Comparative Examples 1 and 3, the cyan ink has an excessively high dynamic surface tension at a lifetime of 30 ms, and thus the penetrability thereof into paper is excessively low. Therefore, graininess was found in a low density printed part (L*=90) of cyan color. As for the dynamic surface tension at a lifetime of 30 ms, the sum thereof of the cyan and blue inks and the sum of the cyan and green inks are 100 mN/m or less. However, since a low cyan density part in the color print pattern was developed by use of the cyan ink alone, color unevenness occurred therein. Note that the low cyan density part cannot be satisfactorily reproduced by employing a cyan ink having a low coloring agent concentration and a blue or green ink having a high coloring agent concentration in combination. This is because the effects of the blue or green ink having a high coloring agent concentration become pronounced in the low cyan density part. Further, in Comparative Examples 1 and 3, each of the blue and green inks has an excessively low dynamic surface tension at a lifetime of 1,000 ms, and thus the penetrability thereof is excessively high. Therefore, blurring occurred in the line patterns of blue color and green color.

In Comparative Example 2, since the cyan ink having a high coloring agent concentration was employed, graininess was found in a low density printed part (L*=90) of cyan color. Further, since the penetrability of the cyan ink is high, blurring occurred in the blue color line pattern reproduced by use of the cyan and magenta inks. Moreover, since the blue ink was not employed, the color reproducibility of blue color was poor.

In Comparative Example 4, since the cyan ink having a high coloring agent concentration was employed as in Comparative Example 2, graininess was found in a low density printed part (L*=90) of cyan color. Further, since the penetrability of the cyan ink is high, blurring occurred in the green color line pattern reproduced by use of the cyan and yellow inks, and the color reproducibility of green color was poor.

The water-based ink set for ink-jet recording of the present invention reduces graininess in a low density printed part, extends a color reproduction range, and reduces blurring and color unevenness. Therefore, the ink set of the invention is useful when a color image is reproduced by a printer for ink-jet recording.

The entire disclosure of the specification, claims and summary of Japanese Patent Application No. 2005-124083 filed on Apr. 21, 2005 is hereby incorporated by reference.

What is claimed is:

1. A water-based ink set for ink-jet recording comprising a cyan ink and a blue ink, wherein dynamic surface tensions of the cyan ink and the blue ink as determined by a maximum bubble pressure method at a measurement temperature of 25° C. satisfy the following inequalities ($I_{CB}$), ($II_{CB}$), ($III_{CB}$) and ($IV_{CB}$)

$$\sigma_{30C} \leq \text{about } 49 \text{ mN/m} \quad (I_{CB})$$

$$\sigma_{30C} + \sigma_{30B} \leq \text{about } 100 \text{ mN/m} \quad (II_{CB})$$

wherein $\sigma_{30C}$ is dynamic surface tension of the cyan ink at a lifetime of 30 ms and $\sigma_{30B}$ is the dynamic surface tension of the blue ink at a lifetime of 30 ms, $$\sigma_{1000B} \geq \text{about } 36 \text{mN/m} \quad (III_{CB})$$

$$\sigma_{1000C} + \sigma_{1000B} \geq \text{about} 70 \text{mN/m} \quad (IV_{CB})$$

wherein $\sigma_{1000C}$ is dynamic surface tension of the cyan ink at a lifetime of 1,000 ms and $\sigma_{1000B}$ is the dynamic surface tension of the blue ink at a lifetime of 1,000 ms.

2. The water-based ink set for ink-jet recording according to claim 1, wherein:
   the cyan ink has a lightness (L*) in a range of from about 60 to about 85 in the L*a*b* colorimetric system; and
   the blue ink has a lightness(L*) in the range of from about 35 to about 45 in the L*a*b* colorimetric system.

3. The water-based ink set for ink-jet recording according to claim 1, wherein
   the cyan ink has a hue angle (h) in a range of from about 215° to about 225° in the L*a*b* colorimetric system.

4. The water-based ink set for ink-jet recording according to claim 1, further comprising a green ink, wherein
   dynamic surface tensions of the cyan ink and the green ink as determined by a maximum bubble pressure method at a measurement temperature of 25° C. satisfy the following inequalities ($I_{CG}$), ($II_{CG}$), ($III_{CG}$) and ($IV_{CG}$)

$$\sigma_{30C} \leq \text{about } 49 \text{ mN/m} \quad (I_{CG})$$

$$\sigma_{30C} + \sigma_{30G} \leq 100 \text{ mN/m} \quad (II_{CG})$$

wherein $\sigma_{30C}$ is dynamic surface tension of the cyan ink at a lifetime of 30 ms and $\sigma_{30G}$ is the dynamic surface tension of the green ink at a lifetime of 30 ms, $$\sigma_{1000G} \geq \text{about } 36 \text{ mN/m} \quad (III_{CG})$$

$$\sigma_{1000C} + \sigma_{1000G} \geq \text{about } 70 \text{ mN/m} \quad (IV_{CG})$$

wherein $\sigma_{1000C}$ is dynamic surface tension of the cyan ink at a lifetime of 1,000 ms and $\sigma_{1000G}$ is the dynamic surface tension of the green ink at a lifetime of 1,000 ms.

5. The water-based ink set for ink-jet recording according to claim 4: wherein:

the green ink has a lightness (L*) in a range of from about 35 to about 60 in the L*a*b* colorimetric system.

6. The water-based ink set for ink-jet recording according to claim 4, wherein:
the green ink has a hue angle (h) in a range of from about 175° to about 215° in the L*a*b* colorimetric system.

7. The water-based ink set for an ink-jet recording according to claim 1, further comprising a yellow ink and/or a magenta ink.

8. The water-based ink set for ink-jet recording according to claim 1, wherein:
the blue ink has a hue angle (h) in a range of from about 270° to about 285° in the L*a*b* colorimetric system.

9. A water-based ink set for ink-jet recording comprising a cyan ink and a green ink, wherein
dynamic surface tensions of the cyan ink and the green ink as determined by a maximum bubble pressure method at a measurement temperature of 25° C. satisfy the following inequalities ($I_{CG}$), ($II_{CG}$), ($III_{CG}$) and ($IV_{CG}$)

$$\sigma_{30C} \leqq \text{about } 49 \text{ mN/m} \qquad (I_{CG})$$

$$\sigma_{30C} + \sigma_{30G} \leqq \text{about } 100 \text{ mN/m} \qquad (II_{CG})$$

wherein $\sigma_{30C}$ is dynamic surface tension of the cyan ink at a lifetime of 30 ms and $\sigma_{30G}$ is the dynamic surface tension of the green ink at a lifetime of 30 ms, $$\sigma_{1000G} \geqq \text{about } 36 \text{ mN/m} \qquad (III_{CG})$$

$$\sigma_{1000C} + \sigma_{1000G} \geqq \text{about } 70 \text{ mN/m} \qquad (IV_{CG})$$

wherein $\sigma_{1000C}$ is dynamic surface tension of the cyan ink at a lifetime of 1,000 ms and $\sigma_{1000G}$ is the dynamic surface tension of the green ink at a lifetime of 1,000 ms.

10. The water-based ink set for ink-jet recording according to claim 9, wherein:
the cyan ink has a lightness (L*) in a range of from about 60 to about 85 in the L*a*b* colorimetric system; and
the green ink has a lightness (L*) in a range of from about 35 to about 60 in the L*a*b* colorimetric system.

11. The water-based ink set for ink-jet recording according to claim 9, wherein
the cyan ink has a hue angle (h) in a range of from about 215° to about 255° in the L*a*b* colorimetric system.

12. The water-based ink set for ink-jet recording according to claim 9, further comprising a yellow ink and/or a magenta ink.

13. The water-based ink set for ink-jet recording according to claim 9, wherein:
the green ink has a hue angle (h) in a range of from about 175° to about 215° in the L*a*b colorimetric system.

* * * * *